May 15, 1945.　　　E. U. LASSEN　　　2,375,928
CONTROLLER FOR MOTOR OPERATED MACHINES
Filed Oct. 5, 1942　　　4 Sheets-Sheet 1

Fig. 1

Inventor
Eivind U. Lassen
By Frank H. Hubbard
Attorney

Fig. 2

Patented May 15, 1945

2,375,928

UNITED STATES PATENT OFFICE 2,375,928

CONTROLLER FOR MOTOR OPERATED MACHINES

Eivind U. Lassen, Whitefish Bay, Wis., assignor to Cutler-Hammer, Inc., Milwaukee, Wis., a corporation of Delaware Application October 5, 1942, Serial No. 460,809

20 Claims. (Cl. 254—172)

This invention relates to controllers for motor operated machines, and is particularly applicable to motor operated towing winches.

Ordinarily in towing winch control it is desired to afford both paying out and reeling in of the tow-line, manual control means and in addition automatic control means, the latter to be designed for protection of the tow-line against undue strains, etc. Also it is ordinarily desired to have automatic transfer from manual control to automatic control when the latter is needed for protection. A form of such combined manual and automatic control now in use employs a so-called tension switch and a so-called reclaiming switch. The tension switch which is usually clutch connected to the winch shifts in one direction as the tension on the tow-line increases above a certain value, and in the reverse direction as the tension on the tow-line subsequently decreases, while the reclaiming switch commonly driven from the winding drum through a slip clutch shifts in one direction as line is paid out, and in the reverse direction as the paid out line is reclaimed, and the present invention is particularly applicable to controllers employing such tension and reclaiming switches.

Of course the additional problems met with in affording suitable control for a towing winch are numerous and vary with the character of the power source, the size of the motor, etc., and the present invention has among its objects to provide control particularly suited to a constant voltage direct-current system and to use of a winch motor of economical horsepower capacity.

Among the more specific objects of the invention is that of affording pay-out of the tow-line at different speeds up to a satisfactory high speed, and providing for each speed a suitable torque value, but decreasing the torque value as the pay-out speed increases, thereby to obtain the desired results with a motor of minimum horsepower capacity.

Another specific object is to effect the desired speed and torque regulation through the medium of suitable means comprising the tension switch but capable of detecting variations in tension more or less independently of said switch.

Various other objects and advantages of the invention will hereinafter appear.

The accompanying drawings illustrate an embodiment of the invention which will now be described, it being understood that the embodiment illustrated is susceptible of various modifications without departing from the scope of the appended claims.

Figure 1:
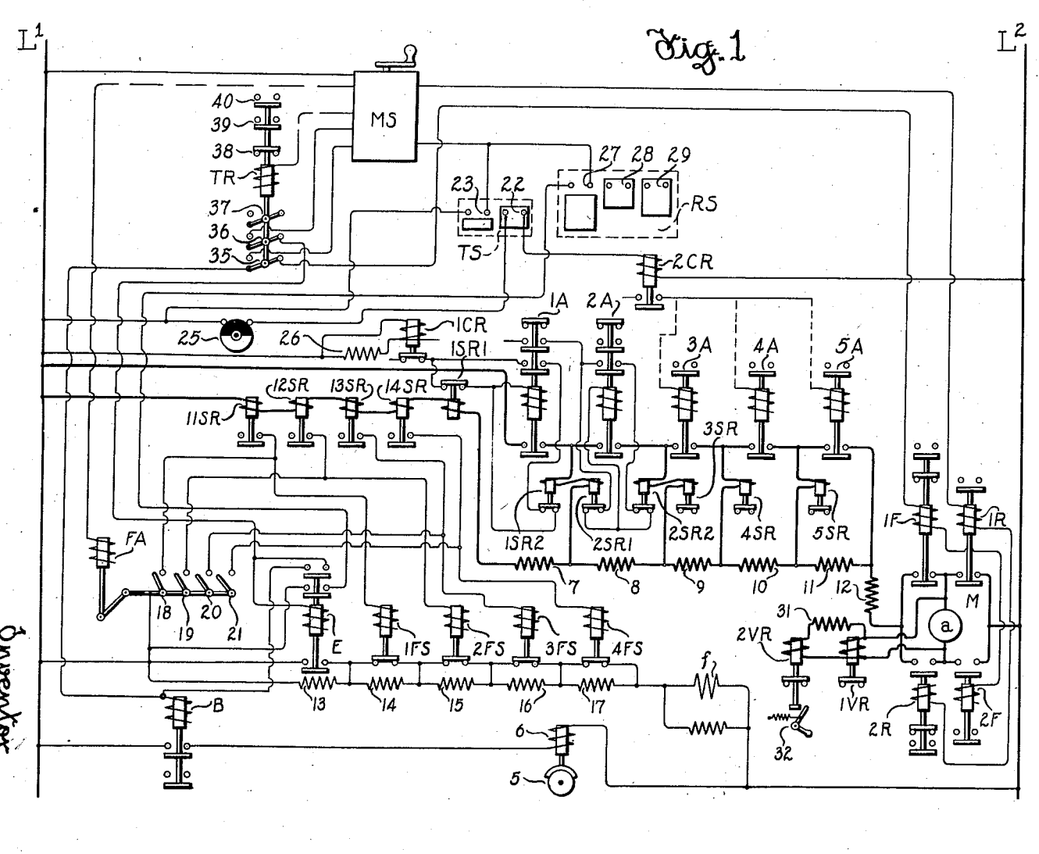
Figure 1 is a diagrammatic view of a towing winch controller with certain circuits omitted for simplicity of illustration.

Referring to Fig. 1, the same shows a motor M comprising an armature $a$ and a field winding $f$, said motor to be supplied from a constant potential direct current source L1, L2. The motor which may be assumed to operate a winch, W, Fig. 4, preferably is provided with an electromagnetically controlled mechanical brake 5. This brake is illustrated as of the type tending to set and having a coil 6 to be energized for brake release.

The motor is reversible through reversal of its armature current by reversing switches 1F, 2F and 1R, 2R. These switches have individual operating windings and as shown the windings of each pair of switches are in series to be controlled by master switch MS shown only in outline in Fig. 1, but illustrated in further detail in Fig. 2. In Fig. 1 the windings of switches 1R and 2R are shown as having a direct connection with the master switch MS, while the windings of switches 1F and 2F have a direct connection with contacts of a switch TR, hereinafter referred to as a transfer relay. Relay TR is shown in Fig. 1 as having connections with the master switch, and as will later appear connects the windings of switches 1F and 2F to the master switch under certain conditions.

Figure 2:
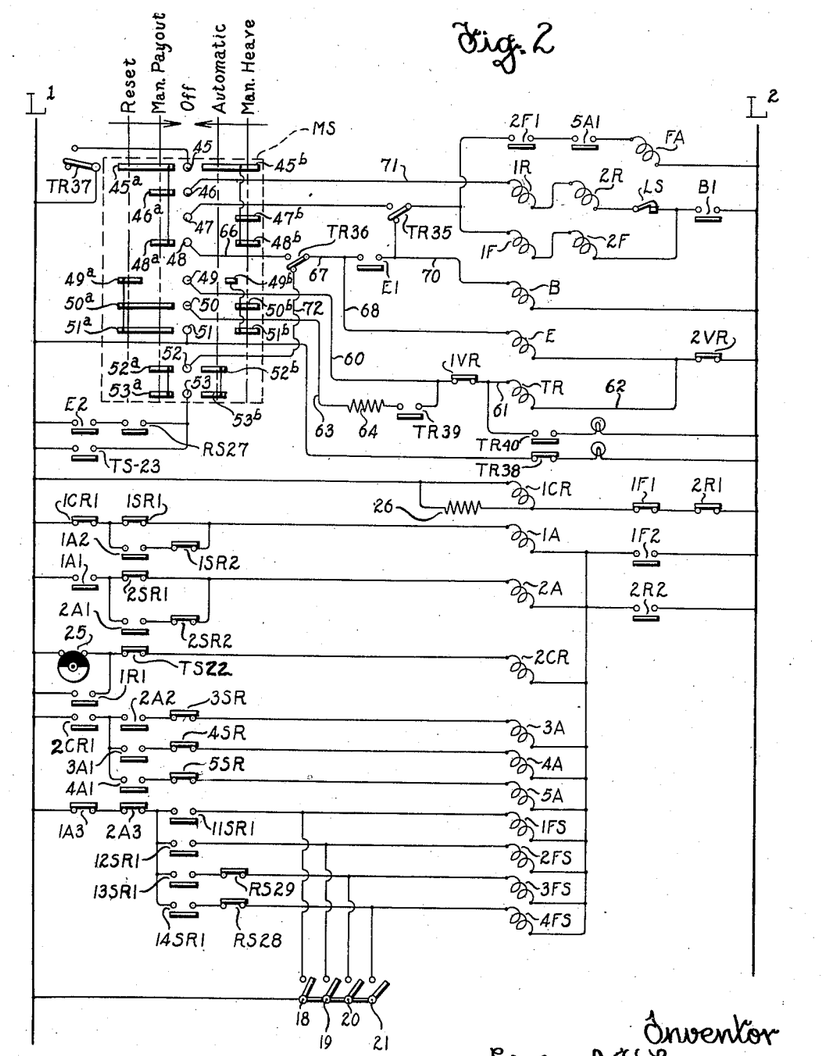
Fig. 2 is a line diagram for the controller of Fig. 1 including the essential circuits omitted from Fig. 1.

The motor armature circuit includes resistors 7, 8, 9, 10, 11 and 12, resistor 12 being permanently included for a purpose hereinafter set forth. Resistors 7, 8, 9, 10 and 11 are subject to exclusion from circuit by electroresponsive accelerating switches 1A, 2A, 3A, 4A and 5A, respectively. The energizing circuits of these switches are not illustrated in full in Fig. 1, but the complete circuits are shown in Fig. 2. However, Fig. 1 shows the winding of switch 1A to be under the control of an electroresponsive relay 1CR and the windings of switches 3A, 4A and 5A to be under the control of an electroresponsive relay 2CR, the broken line showing of connections indicating that such connections include other contacts to be found in Fig. 2. Additionally switches 1A to 5A have series relay control, Fig. 1 showing the relays but not full connections therefor. More specifically, Fig. 1 shows for control of switch 1A a series relay 1SR1 having its operating winding in the motor armature circuit to the left of resistor 7 and a relay 1SR2 having its operating winding in the connection from switch 1A to resistor 8. Fig. 1 shows for control of the operating winding of switch 2A a relay 2SR1 having its operating winding in the connection from switch 1A to resistor 8 and a second relay 2SR2 having its operating winding in the connection from switch 2A to resistor 9. For control of the operating windings of switches 3A, 4A and 5A, Fig. 1 shows relays 3SR, 4SR and 5SR, respectively, having their operating windings included in the short-circuiting connections for resistors 8, 9 and 10, respectively. Additionally Fig. 1 shows switches 1A to 5A as provided with auxiliary contacts, the purposes of which will appear from Fig. 2, certain of these contacts so interlocking switches 1A to 5A as to necessitate their response in sequence.

The field circuit of the motor includes resistors 13, 14, 15, 16 and 17 to be excluded from circuit by electroresponsive switches E, 1FS, 2FS, 3FS and 4FS, respectively, the first switch being of the normally open type, while each of the other switches is of the normally closed type. Thus with all of these switches deenergized only resistor 13 is effective to reduce the motor field strength. The energizing circuits of switches 1FS, 2FS, 3FS and 4FS are under the control of electroresponsive relays 11SR, 12SR, 13SR and 14SR, respectively, which are shown in Fig. 1 with their operating windings in a series relation in the motor armature circuit between line L1 and resistor 7. Fig. 1 does not show in full the energizing circuits of any of these field controlling switches, but it shows connections between the windings of switches 1FS to 4FS and the contacts of their respective relays 11SR to 14SR, and additionally shows said windings to be connected to contacts of a multi-contact electroresponsive relay FA. This relay FA has sets of contacts 18, 19, 20 and 21 connected to line L1 and to the windings of relays 1FS, 2FS, 3FS and 4FS, respectively, said sets of contacts being arranged for engagement and disengagement sequentially as indicated by the differential spacings thereof. Fig. 1 shows the operating winding of relay FA as connected to the master switch MS but the connection comprises a broken line portion indicating omission of contacts shown in Fig. 2. Further Fig. 1 shows the operating winding of switch E controlling resistor 13 as connectable to the master switch MS through contacts of the aforementioned transfer relay TR.

Fig. 1 shows the circuit of the coil 6 of the motor brake 5 to be controlled by an electroresponsive relay B. Also Fig. 1 shows the operating winding of relay B as connected to the transfer relay TR, and as also connected to contacts of switch E.

Again referring to the relay 2CR, Fig. 1 shows the circuit of the operating winding thereof as under the control of a contact device TS which may be assumed to be a tension switch of the type hereinbefore mentioned to shift in one direction as the tension on the tow-line exceeds a given value, and in a reverse direction as the tension subsequently drops (see Fig. 4). Tension switch TS has contacts 22 controlling relay 2CR, which contacts are normally engaged and are disengaged only when the tension is above a predetermined value, said switch also having contacts 23 for a purpose later set forth, which contacts are normally disengaged but engage throughout such period as the tension exceeds a predetermined value. Additionally relay 2CR has in its energizing circuit a switch 25 to close as the winch reels in the tow-line and to open as the winch pays out line. The switch 25 is shown as of a well known rotary friction type to be associated with a suitable reversible element of the equipment to function automatically in the manner just stated.

Again referring to the relay 1CR, the Fig. 1 showing of its energizing circuit is incomplete, such circuit being shown in full in Fig. 2, but Fig. 1 does show the winding of said relay as being connected to line L1 and as being permanently shunted by a resistor 26. The purpose of the shunt including resistor 26 is to afford the relay a time element of well known character in releasing upon interruption of the energizing circuit of said relay.

Figure 4:
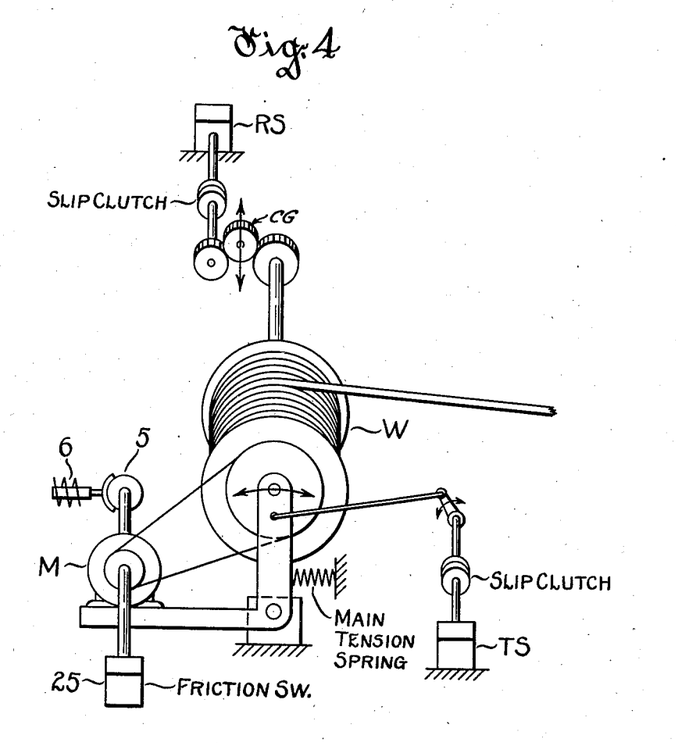
Fig. 4 illustrates schematically a motor driven winch having associated therewith certain of the control elements of Fig. 1. The arrows on gear CG indicate that the driving connection is preserved during shifting of the drum.

The controller shown in Fig. 1 comprises also a contact device RS which may be assumed to be a reclaiming switch of the type hereinbefore mentioned to shift in one direction as the line is paid out, and in a reverse direction as the paid line is reclaimed (see Fig. 4). The device RS comprises normally disengaged contacts 27 which with the aforementioned contacts 23 of tension switch TS control parallel connections between one side of the supply line and a common point on the master switch. Also device RS is shown as having sets 28 and 29 of normally engaged contacts to be disengaged progressively as the pay-out of line progresses and to re-engage in inverse order as the line is reclaimed.

Additionally Fig. 1 shows associated with the armature of motor M two voltage relays 1VR and 2VR to control circuits not shown in Fig. 1 but shown in Fig. 2. The windings of said relays are connected in parallel relationship to each other across the motor armature and the connection of the winding of relay 2VR includes a series resistor 31. Both relays have normally engaged contacts, the relay 2VR being of the latched open type requiring manual release. The latch for the relay 2VR is shown schematically as comprising a spring biased manual element 32 to spring into the path of the relay plunger upon response of said relay.

The transfer relay TR as shown in Fig. 1 comprises three pivoted contact arms 35, 36 and 37 movable together, each being engageable with a lower contact and an upper contact selectively. The arms 35 to 37 normally engage their respective lower contacts and are movable into engagement with their respective upper contacts upon energization of the operating winding of said relay TR. Additionally the transfer relay TR has a set of normally engaged contacts 38 and sets 39 and 40 of normally disengaged contacts. The circuits for all of these contacts are shown in Fig. 2.

Referring now to the further showing of the master switch MS found in Fig. 2, said switch comprises stationary contacts 45, 46, 47, 48, 49, 50, 51, 52 and 53 having cooperating segments divided into two sets. The set of segments to the left of the contacts comprises segments 45a, 46a, 48a, 49a, 50a, 51a, 52a and 53a. The set of segments to the right of the contacts comprises segments 45b, 47b, 48b, 49b, 50b, 51b, 52b and 53b. In off position of the master switch all of the segments disengage their respective contacts, whereas in the position marked "Manual payout" segments 45a, 46a and 48a which are electrically interconnected engage their respective contacts, and segments 50a and 51a which are electrically interconnected engage their respective contacts, while segments 52a and 53a which are electrically interconnected engage their respective contacts. In the position designated "Reset" the segments 46a, 48a, 52a and 53a disengage their respective contacts, whereas segment 49a engages contact 49. In the position designated "Automatic" segment 45b engages contact 45 and segments 52b and 53b which are interconnected engage their respective contacts. In the position marked "Manual heave" segments 52b and 53b disengage contacts 52 and 53, and segments 47b and 48b interconnected with segment 45b engage their respective contacts. Also interconnected segments 50b and 51b engage their respective contacts and during shift from the automatic position to the manual heave position segment 49b interconnected with segments 50b and 51b engages and then disengages contact 49. The contacts 45, 51 and 53 are provided for connection to line L1, the contact 51 having a permanent connection, and the others having temporary line connections hereinafter described in detail.

Figure 3:
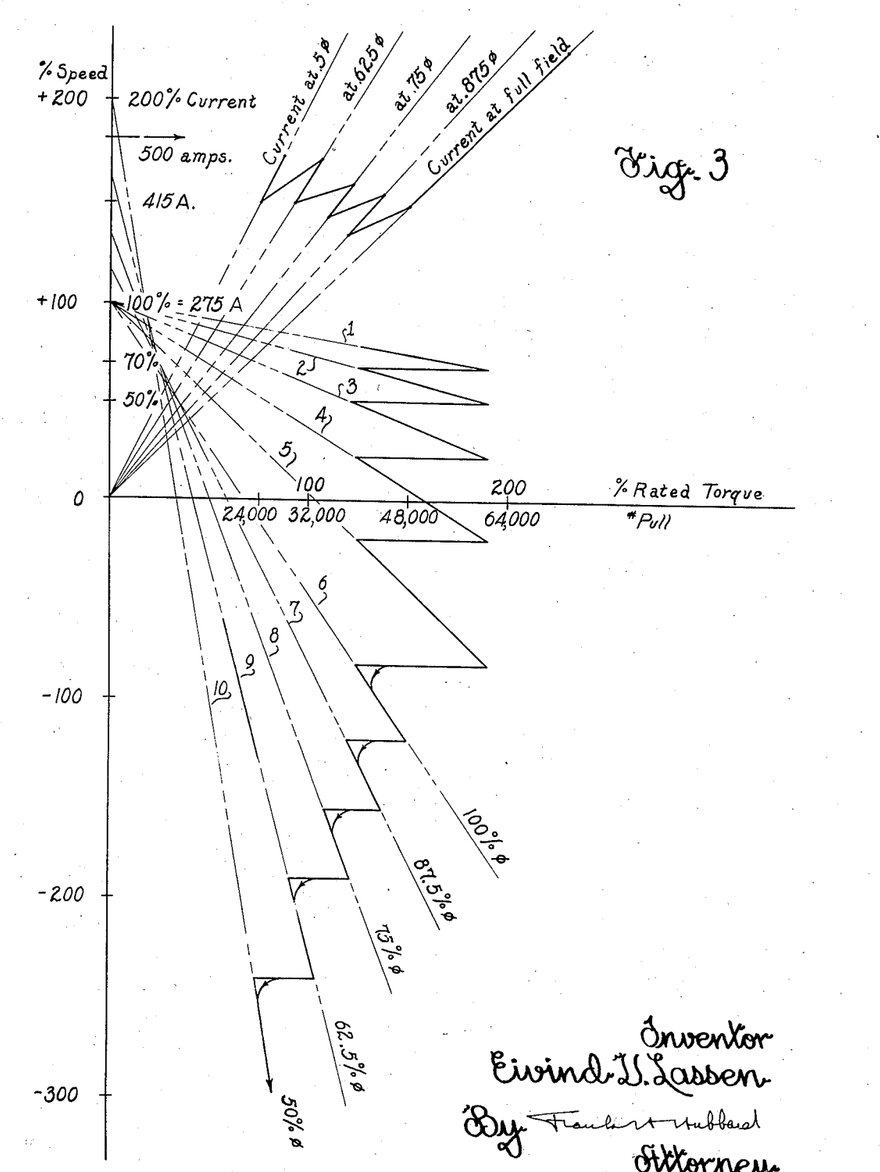
Fig. 3 shows characteristic curves for the controller shown in Figs. 1 and 2.

The operations and functions of the controller will now be described, reference being had to Fig. 2 in describing the circuits, and to Fig. 3 in describing the functions. It will, of course, be understood that the curves shown in Fig. 3 are characteristic of an arbitrarily designed equipment and are referred to only by way of example of the possibilities of the controller. In Fig. 2 the windings of the switches are designated by the reference characters hereinbefore used for their respective switches and except in the case of the series relays and voltage relays each contact is designated by the reference character of its respective switch followed by a distinctive reference numeral. The series relays and voltage relays have their contacts designated only by the reference characters of the relays as each relay has only one set of contacts and as the relay windings are omitted from Fig. 2.

With the master switch in off position manual pay-out is effected by moving the master switch through pay-out position to reset position and then back to pay-out position. In reset position circuit is completed from line L1 to master switch contact 51, thence through segments 51a and 49a to contact 49, by conductor 60, through voltage relay contacts 1VR by conductor 61 to and through the winding of transfer relay TR by conductor 62 to and through voltage relay contacts 2VR to line L2. Transfer relay TR then responds to establish through its arm TR37 a connection between the master switch contact 45 and line L1, and additionally to establish a maintaining circuit for itself from line L1 to contact 51, through segments 51a and 50a to contact 50 by conductor 63 through resistor 64 and the now engaged TR39 contacts to conductor 60. Thus when the master switch is returned to pay-out position it has through the transfer relay a line connection to its contact 45 and through segments 46a and 48a to contacts 46 and 48. From contact 48 circuit extends by conductor 66 through the now raised contact arm TR36 of the transfer relay, by conductors 67 and 68 through the winding of switch E to and through voltage relay contacts 2VR to line L2. Switch E is thus energized to close its main contacts of Fig. 1 and its auxiliary contacts E1, the latter to complete circuit from conductor 67 to conductor 70 and thence to and through the winding of brake relay B to line L2. Relay B then responds to effect release of the motor brake 5 and also to engage its auxiliary contacts B1 to complete the energizing circuit for the windings of reversing switches 1R and 2R, said circuit extending from the master switch contact 46 by conductor 71 to and through said windings and thence through a suitable limit switch LS and contacts B1 to line L2.

Reversing switches 1R and 2R are thus rendered responsive to start the motor in pay-out direction, the brake 5 having been released upon response of relay B and the resistor 13 in the motor field winding circuit having been excluded by response of switch E to provide full field strength of the motor. At this time all armature resistors are in circuit and the value thereof is such that there is not likely to be an inrush of current sufficient to effect response of the series relays 1SR1 and 1SR2 of switches 1A and 2A, which switches tend to respond sequentially upon closure of the contacts of relay 1CR. Relay 1CR has its winding connected across lines L1, L2 through normally closed contacts 1F1 and 2R1 of reversing switches 1F and 2R, respectively, whereby said relay is energized prior to starting of the motor and is deenergized when the motor circuit is completed by either of said reversing switches. Thereupon relay 1CR recloses subject to the time element afforded by the discharge of its winding through resistor 26 and said relay through its contacts 1CR1 completes circuit from line L1 to and through the contacts of series relay 1SR1 to and through the winding of swich 1A and now closed auxiliary contacts 2R2 of switch 2R to line L2. Thus switch 1A is caused to close and in closing its auxiliary contacts 1A1 complete circuit from line L1 to and through the series relay contacts 2SR1 to and through the winding of switch 2A and thence through contacts 2R2 to line L2. Contacts 1A2 of switch 1A together with contacts of series relay 1SR2 now shunt series relay contacts 1SR1 while contacts 2A1 of switch 2A together with series relay contacts 2SR2 now shunt series relay contacts 2SR1. Up to this point the motor has been afforded two steps of acceleration rapidly, whereas the motor now is afforded additional accelerating steps each subject to series relay control.

Such further acceleration is under the control of relay 2CR, the energizing circuit of which is completed upon response of switches 1R and 2R through engagement of their auxiliary contacts 1R1 and 2R2, respectively. This circuit extends from line L1 to and through contacts 1R1 of the tension switch and thence to and through the winding 2CR and contacts 2R2 to line L2. Relay 2CR in responding engages its contacts 2CR1 to complete a connection from line L1 to the parallel circuits of the windings of switches 3A, 4A and 5A. From contact 2CR1 circuit extends to and through the now closed auxiliary contacts 2A2 of switch 2A to and through the contacts 3SR to and through the winding of switch 3A and contacts 2R2 to line L2. Thus switch 3A is rendered responsive subject to delay by its series relay 3SR. Switch 3A through its auxiliary contacts 3A1 connects winding 4A in circuit through the contacts of its series relay 4SR and switch 4A through its auxiliary contacts 4A1 connects winding 5A in circuit through the contacts of its series relay 5SR. Thus switches 4A and 5A are rendered responsive each subject to delay by its respective series relay and switch 5A in closing affords maximum acceleration for manual pay-out, the motor field strength preferably being maintained at a maximum for protection against runaway or dangerous speeds.

Under runaway conditions during pay-out the motor counter-voltage will increase to cause voltage relay 1VR to respond, and said relay through opening of its contacts 1VR will interrupt the circuit of the winding of the transfer relay TR. The transfer relay accordingly will release and in so doing will transfer to automatic tension control even though the master switch remains in pay-out position. The transfer relay through shifting of its contact arm TR37 will have then interrupted the connection between the master switch contact 45 and line L1, with consequent deenergizing of switches 1R and 2R, and other switches including the accelerating switches 1A to 5A.

Considering now the automatic tension control, such control is afforded when the transfer relay TR is deenergized and when in addition the master switch contacts 53 and 52 are bridged, as will be the case when the master switch is in automatic position or is in pay-out position. Under such conditions if the tow-line tension is in excess of the value for which the main tension spring is set, the tension switch will engage its contacts TS23, this effecting energization of the winding of switch E or maintaining said winding energized in the event of response of the tension switch during manual control for pay-out. The circuit for the winding of switch E now extends from line L1 to and through the contacts TS23 to master switch contact 53, thence through segments 53b, 52b or 53a, 52a to contact 52 by conductor 72, through contacts TR36 to conductor 67 and thence through the winding E to line L2 as earlier traced. Also circuit now extends from conductor 67 to and through the contacts E1 and thence to and through the brake relay winding B to line L2. Additionally circuit now extends from conductor 67 to and through contacts E1 and contacts TR35 to and through the windings of reversing switches 1F and 2F and thence through contacts B1 to line L2. Switches 1F and 2F thus respond to complete the motor circuit for motor torque in pull-in direction whereby the motor provides a counter torque for an overhauling load. At this time all accelerating switches 1A to 5A are open and switches 3A, 4A and 5A remain open because relay 2CR is not energized, whereas switches 1A and 2A cannot respond pending release of the relay 1CR subject to its time element. Thus a rather quick pay-out is permitted with a speed and torque relationship as depicted by curve 6 of Fig. 3.

If the surge remains heavy, relays 1SR1 and 2SR1 will open, causing switches 1A and 2A to remain open even after reengagement of the contacts of relay 1CR. Then if the heavy surge continues or increases it will cause relay 11SR to respond to energize the motor field weakening switch 1FS, whereupon with field strength of 87.5% the speed and motor retarding torque relationship will be that depicted by curve 7 of Fig. 3. As shown in Fig. 2, contacts 1A3 and 2A3 of switches 1A and 2A, respectively, complete circuit from line L1 to the contacts 11SR1 so that when relay 11SR responds it completes circuit from its contacts to and through the winding of switch 1FS and thence through contacts 1F2 to line L2 for energization of switch 1FS as aforestated. Current and torque are reduced in consequence of this step of field weakening but not sufficiently to effect release of relay 11SR and as the pull-out speed increases the current increases.

If now the current increases sufficiently to energize relay 12SR, said relay will complete energizing connections for the motor field weakening switch 2FS, as will appear from Fig. 2, and with field weakening to 75% the speed and torque relationship will be that depicted by curve 8 of Fig. 3. Again the current and torque are reduced but not sufficiently to release relay 12SR and again as the pull-out speed increases the current will increase. Hence as will now be apparent field weakening switches 3FS and 4FS under the control of their respective relays 13SR and 14 SR will function similarly to switches 1FS and 2FS to provide additional steps of field weakening. The final speed and torque relationship is that depicted by curve 10, Fig. 3, provision being made for a pay-out speed of 300% with current of about 500 amperes and a retarding torque of about 28,000#.

Should the motor under abnormal conditions tend to reach dangerous high pull-out speeds the voltage relay 2VR if properly designed and adjusted, as for example for response at 435 volts, will disengage its contacts in circuit with the winding of switch E to deenergize said switch. Switch E in releasing will disengage its contacts E1, thereby effecting deenergization of switches 1F, 2F and B to stop the motor and effect setting of the motor brake 5. As hereinbefore pointed out, the relay 2VR upon response is latched open to require manual operation for resetting thereof, and hence for restarting the motor.

Assuming the motor to have been operating at maximum pull-out speed (Fig. 3), if the motor retarding torque decreases to about 22,000# (switches 1A and 2A being deenergized and contacts RS28 and RS29 closed) relay 14SR will release, thereby deenergizing switch 4FS to strengthen the motor field. The retarding torque is thus increased, as shown by curve 9 in comparison with curve 10. Further decrease in torque and current will release relays 13SR, 12SR and 11SR, successively, to restore gradually full field strength of the motor and eventually will effect release of relays 2SR1 and 1SR1, thus permitting switches 1A and 2A to respond to short-circuit their respective resistors in the armature circuit of the motor. When the motor connections have been thus varied the motor should be able to commence reclaiming the tow-line and when the motor starts to so function the friction switch 25 will be rotated to closed position. The friction switch will thereupon complete circuit from line L1 to and through contacts TS22 of the tension switch to and through the winding of relay 2CR and contacts 1F2 to line L2. Relay 2CR will thereupon respond to effect response of switches 3A, 4A and 5A progressively under control of their respective series relays. The resistor 12 is left in the motor armature circuit during reclaiming to serve as a cushioning medium for better control and absorption of sudden surges.

If a second surge occurs during building up of retarding torque or after commencement of reclaiming the automatic action of the system is the same as that aforedescribed, provided that at the time of the additional surge the motor is operating on one of the speed torque curves 10 to 4. On the other hand, in the event of energization of the switches 3A, 4A and 5A or one of the same at that time, the system has an action not previously described. In such event the relay 2CR remains energized pending disengagement of contacts TS22 of the tension switch, which switch is so designed as to permit disengagement of said contacts only when the line tension reaches a value substantially above the value at which tension switch TS23 engages. As soon as switch 3A responds the series relays controlling switches 1A and 2A have their operating windings substantially short-circuited, thus providing for continued energization of switches 1A and 2A regardless of current conditions. The purpose of this provision is to afford the motor in reclaiming operation a more favorable opportunity to accelerate under relatively high tow-line tension than would be possible should the relays just mentioned be left responsive during such acceleration. In a system having the characteristics depicted in Fig. 3 the tension switch may be designed and adjusted to permit disengagement of its contacts 22 at a higher value than that at which TS23 engages. As will appear from Fig. 2, when the tension switch contacts TS22 disengage all switches 3A, 4A and 5A will be released, whereupon the automatic regulation becomes the same as that earlier described.

If the tension switch is restored to initial position prior to reclaiming all or a predetermined length of the line the reclaiming operation continues under the control of the reclaiming switch RS, the contacts TS23 (Fig. 2) of the tension switch then being by-passed by contacts E2 of the then closed switch E with the aid of the then engaged contacts RS27 of the reclaiming switch. This by-pass maintains energized switch E for continued energization of the brake relay B and motor reversing switches 1F and 2F. The contacts RS27 of the reclaiming switch will engage as soon as pay-out of the line is commenced, and will remain engaged until the paid-out line or a predetermined length of paid-out line is fully reclaimed.

The reclaiming switch, as previously pointed out, has additional sets of contacts RS28 and RS29 which as shown in Fig. 2 are connected in the energizing circuits of the motor field regulating switches 4FS and 3FS, respectively. When a given amount of line is paid-out contacts RS28 disengage to interrupt the energizing circuit of switch 4FS and when a further predetermined amount of line is paid-out contacts RS29 disengage to interrupt the energizing circuit of switch 3FS. Thus if the motor speed and torque relationship is that depicted by curve 10 when a certain amount of line has been paid-out the switches 4FS and 3FS will be released progressively for increased retarding torque, and thereby tend to maintain the pay-out within the predetermined limit.

Considering now the manual heave control afforded by the master switch, it involves energization of the transfer relay as in the case of manual pay-out. When the master switch is moved to manual heave position a circuit is completed from line L1 to master switch contact 51 through segments 51b and 49b to contact 49 and thence to and through the winding of the transfer relay, as previously described. This circuit, however, is made only transiently but the aforedescribed maintaining circuit through resistor 64 and transfer relay contacts TR39 is established by engagement of segment 50b with contact 50. As earlier explained, energization of the transfer relay establishes a connection between line L1 and the master switch contact 45 and in manual heave position segment 48b engages contact 48 to complete for the winding of switch E the energizing circuit earlier described, and switch E in responding energizes the winding of brake relay B, as earlier described. The brake relay upon responding engages its contacts B1 to connect the windings of motor reversing switches 1F and 2F to line L2, whereas such windings are now connected to line L1 through the master switch contacts 47 and 47b and contacts TR35 of the transfer relay. Thus switches 1F and 2F are rendered responsive to start the motor in reclaiming direction. Response of switch 1F disengages its contacts 1F1 to deenergize the previously energized relay 1CR, thereby permitting switches 1A and 2A to respond in sequence immediately. Also this operation of the motor closes the friction switch 25 to energize relay 2CR, as previously explained, and response of this relay permits the switches 3A, 4A and 5A to close progressively subject to retardation by this respective series relays. When switch 5A closes it engages its auxiliary contacts 5A1 which together with now closed auxiliary contacts 2F1 of switch 2F connect the winding of the multi-contact relay FA across lines L1, L2, the connections for this winding being in part common to the connection of windings 1F and 2F. Thereupon the winding FA responds to close progressively contacts 18, 19, 20 and 21 to energize progressively the motor field regulating switches 1FS, 2FS, 3FS and 4FS, or such of the same as it may be deemed desirable for obtaining a high speed commensurate with the required torque.

What I claim as new and desire to secure by Letters Patent is:

1. In control for a towing winch motor which has a shunt field and is supplied from a direct current source of substantially constant potential, in combination, means controlling continuity of the motor circuit and direction of flow of current in respect of an element of the motor, armature resistance varying means, field resistance varying means and automatic control means for the aforementioned means responsive to tension on the tow-line in excess of a predetermined value to effect energization of the motor to oppose pay-out, said automatic means effecting restriction of the torque of the motor through the medium of the first mentioned resistance varying means and thereafter through the medium of the second mentioned resistance varying means effecting field weakening for a steep speed torque curve characteristic to meet severe tension conditions.

2. In control for a towing winch motor which has a shunt field and is supplied from a direct current source of substantially constant potential, in combination, means controlling continuity of the motor circuit and direction of flow of current in respect of an element of the motor, armature resistance varying means, field resistance varying means and automatic control means for the aforementioned means responsive to tension on the tow-line in excess of a predetermined value to effect energization of the motor to oppose payout, said automatic means effecting restriction of the torque of the motor through the medium of the first mentioned resistance varying means, and thereafter through the medium of the second mentioned resistance varying means effecting gradual field weakening for a steep speed torque curve characteristic to meet severe tension conditions, effecting graduation of field strength according to the excess in tension above said predetermined value.

3. In control for a towing winch motor having shunt field and being supplied from a direct current source of substantially constant potential, in combination, means controlling continuity of the motor circuit and direction of flow of current in respect of an element of the motor, armature resistance varying means, field resistance varying means and automatic control means for the aforementioned means responsive to a tension on the tow-line in excess of a predetermined value to effect energization of the motor to oppose pay-out, said automatic means effecting restriction of the torque of the motor through the medium of the first mentioned resistance varying means, and thereafter through the medium of the second mentioned resistance varying means effecting gradual field weakening for a steep speed torque curve characteristic to meet severe tension conditions, gradually reducing the motor torque as the speed torque curve is made steeper.

4. In control for a towing winch motor having a shunt field and being supplied from a direct current source of substantially constant potential, in combination, means to control continuity of the motor circuit and direction of flow of current to an element of the motor, resistance varying means for the motor armature circuit, resistance varying means for the motor field circuit, and automatic control means for the aforementioned means effecting through the medium thereof motor energization to oppose pay-out of the tow-line and subsequently to reclaim the tow-line, said automatic means controlling said resistance varying means to afford the motor a steep speed torque curve characteristic to meet severe tension conditions.

5. In control for a towing winch motor having a shunt field and being supplied from a direct current source of substantially constant potential, in combination, means to control continuity of the motor circuit and direction of flow of current to an element of the motor, resistance varying means for the motor armature circuit, resistance varying means for the motor field circuit, and automatic control means for the aforementioned means effecting through the medium thereof motor energization to oppose pay-out of the tow-line and subsequently to reclaim the tow-line, said automatic control means through the medium of said resistance varying means affording the motor a steep speed torque curve characteristic to meet severe tension, reducing the motor torque as the speed torque curve is made steeper.

6. In control for a towing winch motor having a shunt field and being supplied from a direct current source of substantially constant potential, in combination, means to control continuity of the motor circuit and direction of flow of current to an element of the motor, resistance varying means for the motor armature circuit, resistance varying means for the motor field circuit, and automatic control means for the aforementioned means effecting through the medium thereof motor energization to oppose pay-out of the tow-line and subsequently to reclaim the tow-line, said automatic control means effecting through the medium of said resistance varying means regulation of the motor torque during pay-out according to tension conditions and acceleration of the motor in reclaiming and said automatic means through an initial stage of acceleration being responsive to a given tension on the tow-line to again afford pay-out control and at a later stage affording pay-out control only when the tow-line is subjected to a substantially greater tension.

7. In a control for a towing winch motor having a shunt field and being supplied from a direct current source of substantially constant potential, in combination, motor connecting and reversing means, armature resistance varying means, field resistance varying means, and automatic control means for the aforementioned means responsive to tension on the tow-line in excess of a predetermined value to effect energization of the motor to oppose pay-out, said automatic means effecting restriction of the torque of the motor through the medium of the first mentioned resistance varying means and thereafter through the medium of the second mentioned resistance varying means effecting field weakening for a steep speed torque curve characteristic to meet severe tension conditions, and said automatic means comprising a mechanically operated tension switch and electroresponsive tension switches responsive to varying current conditions in the motor circuit.

8. In control for a towing winch motor having a shunt field and being supplied from a direct current source of constant potential, in combination, motor connecting and reversing means, resistance varying means for the motor armature circuit, resistance varying means for the motor field circuit, and automatic control means for the aforementioned means effecting through the medium thereof motor energization to oppose pay-out of the tow-line and subsequently to reclaim the tow-line, affording the motor a steep speed torque curve characteristic to meet severe tension conditions, and said automatic means comprising a mechanically operated tension responsive switch, a mechanically operated reclaiming switch and electroresponsive tension switches responsive to varying current conditions in the motor circuit.

9. In control for a towing winch motor having a shunt field and being supplied from a direct current source of constant potential, in combination, motor connecting and reversing means, resistance varying means for the motor armature circuit, resistance varying means for the motor field circuit, and automatic control means for the aforementioned means effecting through the medium thereof motor energization to oppose pay-out of the tow-line and subsequently to reclaim the tow-line, affording the motor a steep speed torque curve characteristic to meet severe tension conditions, and said automatic means comprising a mechanically operated tension responsive switch, a mechanically operated reclaiming switch, and electroresponsive switches responsive to varying current conditions in the motor circuit, said reclaiming switch effecting field strengthening of the motor upon predetermined pay-out of the tow-line if at that time the motor field strength has been reduced to a predetermined value.

10. In control for a towing winch motor having a shunt field and being supplied from a direct current source of substantially constant potential, in combination, motor connecting and reversing means, resistance varying means for the motor armature circuit, resistance varying means for the motor field circuit and both manual and automatic control means for the aforementioned means, said automatic means predominating under predetermined conditions and effecting in response to tension on the towline in excess of a predetermined value energization of the motor to oppose pay-out effecting restriction of the motor torque through the medium of said first mentioned resistance varying means, and thereafter effecting field weakening of the motor through the medium of the second mentioned resistance varying means for a steep speed torque curve characteristic to meet severe tension conditions.

11. In control for a towing winch motor having a shunt field and being supplied from a direct current source of substantially constant potential, in combination, motor connecting and reversing means, resistance varying means for the motor armature circuit, resistance varying means for the motor field circuit and both manual and automatic control means for the aforementioned means, said automatic means predominating under predetermined conditions and effecting in response to tension on the tow-line in excess of a predetermined value energization of the motor to oppose pay-out, effecting restriction of the motor torque through the medium of said first mentioned resistance varying means, and thereafter effecting field weakening of the motor through the medium of the second mentioned resistance varying means for a steep speed torque curve characteristic to meet severe tension conditions and said automatic means effecting reduction of the motor torque as the speed torque curve is made steeper.

12. In control for a towing winch motor having a shunt field and being supplied from a direct current source of substantially constant potential, in combination, motor connecting and reversing means, resistance varying means for the motor armature circuit, resistance varying means for the motor field circuit and both manual and automatic control means for the aforementioned means, said automatic means predominating under predetermined conditions and effecting in response to tension on the tow-line in excess of a predetermined value motor energization to oppose pay-out and subsequently to reclaim, restricting during pay-out the torque of the motor through the medium of the first mentioned resistance varying means, and additionally effecting in steps at predetermined tension values field weakening through the medium of the second mentioned resistance varying means for an increasingly steep speed torque curve characteristic to meet increasingly severe tension conditions.

13. In control for a towing winch motor having a shunt field and being supplied from a direct current source of substantially constant potential, in combination, motor connecting and reversing means, resistance varying means for the motor armature circuit, resistance varying means for the motor field circuit and both manual and automatic control means for the aforementioned means, said automatic means predominating under predetermined conditions and effecting in response to tension on the tow-line in excess of a predetermined value motor energization to oppose pay-out and subsequently to reclaim, restricting during pay-out the torque of the motor through the medium of the first mentioned resistance varying means, and additionally effecting in steps at predetermined tension values field weakening through the medium of the second mentioned resistance varying means for an increasingly steep speed torque curve characteristic to meet increasingly severe tension conditions, at the same time reducing the torque of the motor as the speed torque curve is made steeper.

14. In a control system for towing winches and the like, in combination, a motor having a shunt field, a supply source therefor, means to control connections between said motor and said source and to afford reversals of the motor, resistance varying means for the motor armature circuit, resistance varying means for the motor field circuit and means responsive to load on the motor in excess of a predetermined value to effect through the medium of the first mentioned means energization of the motor to oppose rotation thereof by its load, effecting restriction of the motor torque through the medium of the armature resistance varying means, and thereafter through the medium of the field resistance varying means effecting field weakening according to load conditions to afford an increasingly steep speed torque curve characteristic and reduction of the motor torque as the speed torque curve is made steeper.

15. In a control system for towing winches and the like, in combination, a motor having a shunt field, a supply source therefor, means to control connections between said motor and said source and to afford reversals of the motor, resistance varying means for the motor armature circuit, resistance varying means for the motor field circuit, both of said resistance varying means including control relays having windings subjected to current in the motor armature circuit and means responsive to load on the motor in excess of a predetermined value to effect through the medium of the first mentioned means energization of the motor to oppose rotation thereof by its load, effecting restriction of the motor torque through the medium of the armature resistance varying means, and thereafter through the medium of the field resistance varying means effecting field weakening according to the current conditions in the motor circuit to afford an increasingly steep speed torque curve characteristic.

16. In a control system for towing winches and the like, in combination, a motor having a shunt field, a supply source therefor, means to control connections between said motor and said source and to afford reversals of the motor, resistance varying means for the motor armature circuit, resistance varying means for the motor field circuit, both of said resistance varying means including control relays having windings subjected to current in the motor armature circuit and means responsive to load on the motor in excess of a predetermined value to effect through the medium of the first mentioned means energization of the motor to oppose rotation thereof by its load, effecting restriction of the motor torque through the medium of the armature resistance varying means, and thereafter through the medium of the field resistance varying means effecting field weakening according to current conditions in the motor circuit to afford an increasingly steep speed torque curve characteristic, decreasing the motor torque as the speed torque curve is made steeper.

17. In a control system for towing winches and the like, in combination, a motor having a shunt field, a supply source therefor, means to control connections between said motor and said source and to afford reversals of the motor, resistance varying means for the motor armature circuit, resistance varying means for the motor shunt field circuit, both of said resistance varying means including control relays having windings subjected to current in the motor armature circuit, and means responsive to load on the motor to effect through the medium of the first mentioned means energization of the motor to oppose rotation thereof by its load, effecting restriction of the motor torque through the medium of the armature resistance varying means, and thereafter through the medium of the field resistance varying means effecting field weakening according to the current conditions in the motor circuit for an increasingly steep speed torque curve characteristic, said load responsive means upon subsequent decrease in load effecting through the medium of the resistance varying means field strengthening and acceleration of the motor.

18. In a control system for towing winches and the like, in combination, a motor having a shunt field, a supply source therefor, means to control connections between said motor and said source and to afford reversals of the motor, resistance varying means for the motor armature circuit, resistance varying means for the motor shunt field circuit, both of said resistance varying means including control relays in turn controlled by the current in the motor armature circuit, and both manual and load responsive means for controlling the aforementioned means, the manual means being operable to effect reverse operations of the motor but subject to domination by said load responsive means under predetermined load conditions, and said load responsive means effecting through the medium of the first mentioned means energization of the motor to oppose rotation thereof by its load, and effecting through the medium of said resistance varying means an increasingly steep speed torque curve characteristic for an increasing load.

19. In a control system for towing winches and the like, in combination, a motor having a shunt field, a supply source therefor, means to control connections between said motor and said source and to afford reversals of the motor, resistance varying means for the motor armature circuit, resistance varying means for the motor shunt field circuit, both of said resistance varying means including control relays in turn controlled by the current in the motor armature circuit, and both manual and load responsive means for controlling the aforementioned means, the manual means being operable to effect reverse operations of the motor but subject to domination by said load responsive means under predetermined load conditions, and said load responsive means effecting through the medium of the first mentioned means energization of the motor to oppose rotation thereof by its load and effecting through the medium of said resistance varying means an increasingly steep speed torque curve characteristic for an increasing load, reducing the motor torque as the speed torque curve is made steeper.

20. In a control system for towing winches and the like, in combination, a motor having a shunt field, a supply source therefor, means to control connections between said motor and said source and to afford reversals of the motor, resistance varying means for the motor armature circuit, resistance varying means for the motor shunt field circuit, both of said resistance varying means including control relays in turn controlled by the current in the motor armature circuit, and both manual and load responsive means for controlling the aforementioned means, the manual means being operable to effect reverse operations of the motor but subject to domination by said load responsive means under predetermined load conditions, and said load responsive means effecting through the medium of the first mentioned means energization of the motor to oppose rotation thereof by its load and effecting through the medium of said resistance varying means an increasingly steep speed torque curve characteristic for an increasing load, reducing the motor torque as the speed torque curve is made steeper but thereafter effecting increase of the motor torque to a predetermined degree under given conditions with a maximum load.

EIVIND U. LASSEN.